March 24, 1942.  E. W. MALMBORG  2,277,553
WEEDLESS BAIT
Filed Oct. 28, 1940
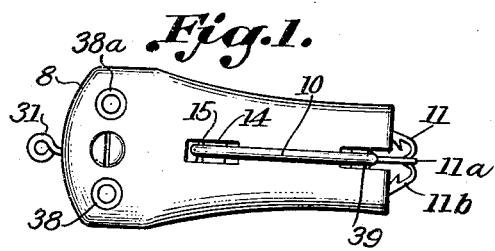
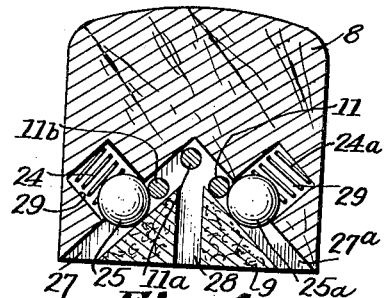
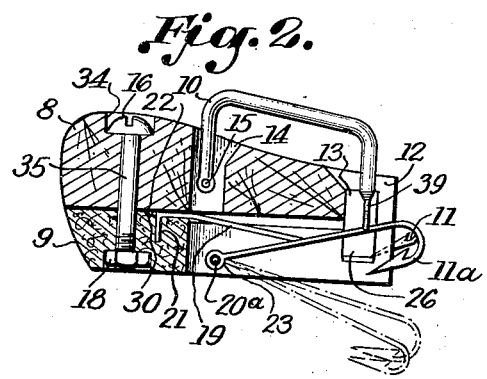
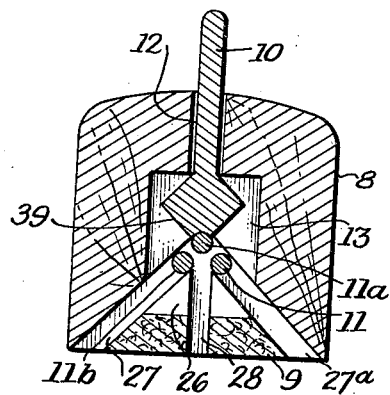
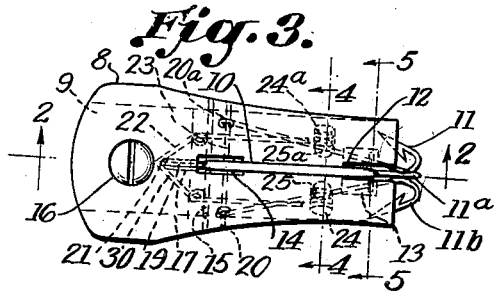
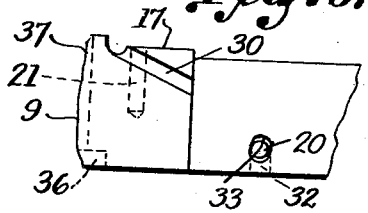
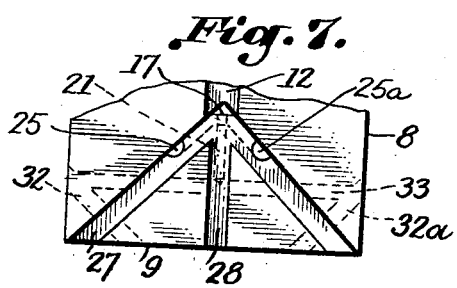
Inventor
Eric William Malmborg Patented Mar. 24, 1942

2,277,553

UNITED STATES PATENT OFFICE 2,277,553

WEEDLESS BAIT

Eric William Malmborg, Detroit, Mich.

Application October 28, 1940, Serial No. 363,139

9 Claims. (Cl. 43—39)

This invention relates to weedless artificial baits and the primary object is to provide in a fishing lure of the kind commonly known as plugs or baits a novel and effective means of concealing hooks so that the bait may be drawn through the water without becoming entangled with weeds or other obstructions growing in the water.

Another and important object is to provide a bait of this kind wherein the hooks may be concealed and protected while the bait is being cast and manipulated in the water but which includes means for releasing the hooks when a fish strikes or takes the bait in its mouth so that the hooks will swing downward and at forty-five degree angles in position to engage and hold the fish.

Another object is to provide a bait of this kind wherein the hook disengaging means is so arranged that they will form no impediment toward the fish taking the bait in the natural manner.

Having briefly recounted the nature and objects of the invention subsidiary objects and advantages will be apparent from the ensuing comprehensive disclosure of the invention in its practical embodiment illustrated in the accompanying drawing.

In the drawing, Figure 1, is a plan view of the bait. Figure 2 is a longitudinal section on the line 2—2 in Figure 3. Figure 3 is a top plan view with details shown with dotted lines. Figure 4 is an enlarged cross section taken on line 4—4 in Figure 3. Figure 5 is an enlarged cross section taken on line 5—5 in Figure 3. Figures 6 and 7 are enlarged fragmentary views of detail.

The drawing is illustrative of a practical embodiment of the invention and depicts two body members 8 and 9 joined together to represent one unit when assembled.

In performing the aforesaid objects the following details and features have been provided:

An upper body member 8 with a ninety degree longitudinal slot cut through its central lower portion for a ninety degree V shaped lower body member 9 to fit into, joined securely together to represent one unit by means of a round head screw 16 and a hexagon nut 18, which fit into hole 37 and counterbores 34 and 36 respectively, lower body member has a recess on each of its forty-five degree sides and thereby creating slots 27 and 27a when fully assembled for hooks 11 and 11b to swing into and also conceal same, said lower body also has a perpendicular slot 28 cut through its center to accommodate center hook 11a for free swing and concealment of same to make it weedless.

Two steel balls 25 and 25a and compression coil springs 24 and 24a are inserted into holes 29 and 29a to work freely for purpose of releasing and holding hooks in place, said holes are drilled at right angles with V slot faces in upper body member and deep enough to allow steel balls 25 and 25a and springs 24 and 24a to function freely.

A round wire spring 19 flattened on its contact point is provided to bear on hook 11a for instantaneous release when pressure is applied on trigger 10. The spring 19 is locked between the lower and upper body members by means of its V-shaped front end fitting into hole 21 and recess 17.

A round wire spring 22 has a V-shaped front end that is interlocked in recess 30 between lower body member 9 and upper body member 8. The spring 22 is arranged to bear on hooks 11 and 11b for instantaneous release when pressure is applied on trigger 10 which in turn releases all hooks by means of the cam 39 which has a concave radius on its rear lower point to conform with hook 11a and a ninety degree V shaped construction to accommodate hooks 11 and 11b. All hooks are simultaneously released by a slight pressure on said trigger which is pivoted on a horizontally located pin 15 and has its lower rear end fitting into a slot 14.

A slot 12 and recess 13 is provided for the purpose of assembling and clearance for trigger cam 39. An additional recess 26 is also provided in the rear portion of the lower body member 9 for purpose of additional clearance for the trigger cam 39. Hooks 11 and 11b are pivoted on pins 20 and 20a driven into holes 32 and 32a which are drilled at right angles with slots 27 and 27a. The center hook 11a is pivoted on a pin 23 driven into horizontal hole 33 drilled in line through upper and lower body members 8 and 9 respectively. 38 and 38a represent the eyes of bait, and 31 is an eye bolt fastened to upper body member 8 provided to attach fishing line onto.

Having thus described my invention what I claim as new and desire to protect by Letters Patent is:

1. A weedless fishing bait and hook assembly comprising an upper body member, a lower body member, slots in said body members, hooks in said slots, resilient means engaging said hooks to normally urge the same down and outward from said slots, pressure responding members connected to said body members for releasably holding the hooks in said slots for protection from weeds and other obstructions in the water when casting or trolling, and said lower body member being of greater density than said upper body member so that said bait assembly maintains its upright position in water at all times.

2. A bait comprising, an upper body member, a lower body member, means for securing said upper body member and lower body member together, a slot in said lower body member, a fish hook pivotally mounted in said slot, releasable means to hold said hook within said slot to prevent said hook from being snagged by weeds, and trigger means actuated by a fish striking the bait to release said releasable means and to permit said hook to project from said slot.

3. A bait comprising, an upper body member, a lower body member, means for securing said upper body member and lower body member together, a plurality of slots in said lower body member, fish hooks pivotally mounted in said slots, releasable means to hold said hooks within said slots to prevent said hooks from being snagged by weeds, and trigger means actuated by a fish striking the bait to release said releasable means and to permit said hooks to project from said slots.

4. A bait comprising, an upper body member, a lower body member, means for securing said upper body member and lower body member together, a slot in said lower body member, a fish hook pivotally mounted in said slot, releasable means to hold said hook within said slot to prevent said hook from being snagged by weeds, trigger means actuated by a fish striking the bait to release said releasable means and to permit said hook to project from said slot, and spring means urging said hook outwardly upon actuation of said trigger means.

5. A bait comprising, an upper body member, a lower body member, means for securing said upper body member and lower body member together, a plurality of slots in said lower body member, fish hooks pivotally mounted in said slots, releasable means to hold said hooks within said slots to prevent said hooks from being snagged by weeds, trigger means actuated by a fish striking the bait to release said releasable means and to permit said hooks to project from said slots, and cam means on said trigger means contacting said hooks to release said releasable means upon actuation of said trigger means.

6. A bait comprising, an upper body member, a lower body member, means for securing said upper body member and lower body member together, a slot in said lower body member, a fish hook pivotally mounted in said slot, a yieldable detent within said slot engaging the shank of said hook to retain said hook within said slot to prevent snagging on weeds, and trigger means actuated by a fish striking the bait to disengage said hook from said yieldable detent to permit said hook to project from said slot.

7. A bait comprising a body member, a slot in said body member, a fish hook pivotally mounted in said slot, releasable means to hold said hook within said slot to prevent said hook from being snagged by weeds, and trigger means actuated by a fish striking the bait to release said releasable means and to permit said hook to project from said slot.

8. A bait comprising an upper body member, a lower body member of triangular cross section fitting within a recess in said upper body member, means for securing said upper body member and lower body member together, slots along the sides of said lower body member, fish hooks pivotally mounted in said slots, releasable means extending in said slots to hold said hooks within said slots, and trigger means extending within said slots actuated by a fish striking the bait to release said releasable means and permit said hooks to project from said slots.

9. A bait comprising an upper body member, a lower body member of triangular cross section fitting within a recess in said upper body member, means for securing said upper body member and lower body member together, slots along the sides of said lower body member, a slot in said lower body member intermediate said first-named slots, said slots intersecting along a common line, fish hooks pivotally mounted in said slots, releasable means extending in said slots to hold said hooks within said slots, and trigger means extending within said slots actuated by a fish striking the bait to release said releasable means and permit said hooks to project from said slots.

ERIC WILLIAM MALMBORG.